(12) United States Patent
Marmaropoulos et al.

(10) Patent No.: US 7,422,476 B2
(45) Date of Patent: Sep. 9, 2008

(54) LUGGAGE FOR COOPERATING WITH VARIOUS PORTABLE DEVICES

(75) Inventors: George Marmaropoulos, Yorktown Height, NY (US); Kyriakos (Jack) Mama, London (GB); Giang Truong Vu, New York, NY (US); Nancy Alice Tilbury, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 255 days.

(21) Appl. No.: 10/558,711

(22) PCT Filed: May 24, 2004

(86) PCT No.: PCT/IB2004/001769

§ 371 (c)(1), (2), (4) Date: Nov. 29, 2005

(87) PCT Pub. No.: WO2004/007141

PCT Pub. Date: Dec. 9, 2004

(65) Prior Publication Data

US 2007/0018817 A1    Jan. 25, 2007

Related U.S. Application Data

(60) Provisional application No. 60/474,825, filed on May 30, 2003.

(51) Int. Cl.
*H05K 7/16* (2006.01)

(52) U.S. Cl. .................. 439/577; 185/15; 190/18 A; 455/575.7

(58) Field of Classification Search ............... 439/577, 439/575.7; 206/320; 190/11, 109, 18 A; 185/15; 455/575.7, 351
See application file for complete search history.

(56) References Cited

U.S. PATENT DOCUMENTS

| | | | | |
|---|---|---|---|---|
| 1,804,676 A | * | 5/1931 | Dalton | 455/269 |
| 2,486,536 A | * | 11/1949 | Olson | 455/344 |
| 4,050,493 A | * | 9/1977 | Cho | 150/106 |
| 4,677,654 A | * | 6/1987 | Lagin et al. | 455/575.1 |
| 5,093,929 A | * | 3/1992 | Stolarczyk et al. | 455/40 |
| 5,105,338 A | | 4/1992 | Held | |
| 5,212,628 A | * | 5/1993 | Bradbury | 361/683 |
| 5,217,119 A | | 6/1993 | Hollingsworth | |
| 5,226,540 A | * | 7/1993 | Bradbury | 206/576 |
| 5,379,893 A | | 1/1995 | Ruiz | |
| 5,400,903 A | | 3/1995 | Cooley | |
| 5,494,157 A | | 2/1996 | Golenz et al. | |
| 5,524,754 A | | 6/1996 | Hollingsworth | |

(Continued)

FOREIGN PATENT DOCUMENTS

EP     0 689 298 A1    12/1985

(Continued)

*Primary Examiner*—Neil Abrams
(74) *Attorney, Agent, or Firm*—Paul Im; Michael E. Belk

(57) ABSTRACT

Luggage or carrying container (1) having an interface (10) for cooperating with one or more electronic and/or wireless devices (20, 22, 24, 26, 28), a rechargeable power source (30), an integrated antenna (40), and a wireless communication system (50). The luggage (1) allows a user to better manage various electronic devices/accessories in terms of space, efficiency and operation during travel.

23 Claims, 3 Drawing Sheets

U.S. PATENT DOCUMENTS

| | | | |
|---|---|---|---|
| 5,586,168 A * | 12/1996 | Bucalo et al. | 455/575.1 |
| 5,607,054 A | 3/1997 | Hollingsworth | |
| 5,621,299 A | 4/1997 | Krall | |
| 5,639,004 A | 6/1997 | Carlton et al. | |
| 5,710,987 A * | 1/1998 | Paulick | 455/575.7 |
| 5,768,217 A * | 6/1998 | Sonoda et al. | 368/10 |
| 5,971,148 A | 10/1999 | Jackson | |
| 6,087,952 A | 7/2000 | Prabhakaran | |
| 6,098,769 A | 8/2000 | Yen | |
| 6,356,238 B1 * | 3/2002 | Gainor et al. | 343/718 |
| 6,531,985 B1 * | 3/2003 | Jones et al. | 343/702 |
| 6,769,588 B2 * | 8/2004 | Zheng | 224/576 |
| 2002/0063072 A1 * | 5/2002 | Pham | 206/320 |
| 2002/0094789 A1 * | 7/2002 | Harano | 455/90 |
| 2002/0172191 A1 | 11/2002 | Harrison | |

FOREIGN PATENT DOCUMENTS

| | | |
|---|---|---|
| EP | 0 323 335 A2 | 7/1989 |
| JP | 09154619 | 6/1997 |

\* cited by examiner

LUGGAGE FOR COOPERATING WITH VARIOUS PORTABLE DEVICES

CROSS REFERENCE TO RELATED APPLICATION

This application claims the benefit of U.S. provisional application Ser. No. 60/474,825 filed May 30, 2003 which is incorporated herein in whole by reference.

The present invention relates to luggage. More particularly the present invention relates to luggage for cooperating with various portable electronic and/or wireless devices.

When traveling, often business people and the like are required to carry various electronic devices such as for example, laptops, mobile phones, portable printers, PDA's, DVD/CD players, projectors/cameras, as well as all of the corresponding accessories (e.g., battery chargers, transformers, adapters, etc.). The management of the various electronic devices/accessories in terms of space, efficiency and use is often an arduous task.

Various carrying cases have been devised in an effort to minimize some of the drawbacks of traveling with electronic equipment, see for example, U.S. Pat. Nos. 5,105,338; 5,217,119; 5,379,893; 5,400,903; 5,494,157; 5,524,754; 5,607,054; 5,639,004; 5,971,148; and 6,098,769. Notwithstanding these efforts, there has yet to be devised a system for cooperating with luggage, or the like, to minimize or eliminate some of the drawbacks of traveling with electronic devices/accessories and that enhances the efficacy of such devices/accessories.

It is an object of the present invention to provide luggage with an interface for cooperating with various portable electronic and/or wireless devices to enhance the effectiveness thereof.

It is another object of the present invention to provide such luggage with a power source having relatively minimal space requirements.

It is still another object of the present invention to provide such luggage with a power generating assembly for cooperating with one or more wheels of the luggage to refresh the power source.

It is another object of the present invention to provide such luggage capable of refreshing the power source via an external supply.

It is further another object of the present invention to provide such luggage with an antenna for improving the capabilities of the various portable electronic and/or wireless devices.

It is yet still another object of the present invention to provide such luggage with wireless communication system for cooperating with and/or enhancing the capabilities of the one or more electronic and/or wireless devices.

These and other objects and advantages of the present invention are achieved by luggage having an interface, a power source, a power generating assembly, an antenna, and a wireless communication system, or any combination of the same. The present invention provides for luggage that enhances the effectiveness of various portable devices and ultimately improves the overall traveling experience for business people required to carry such devices.

Figure 1:
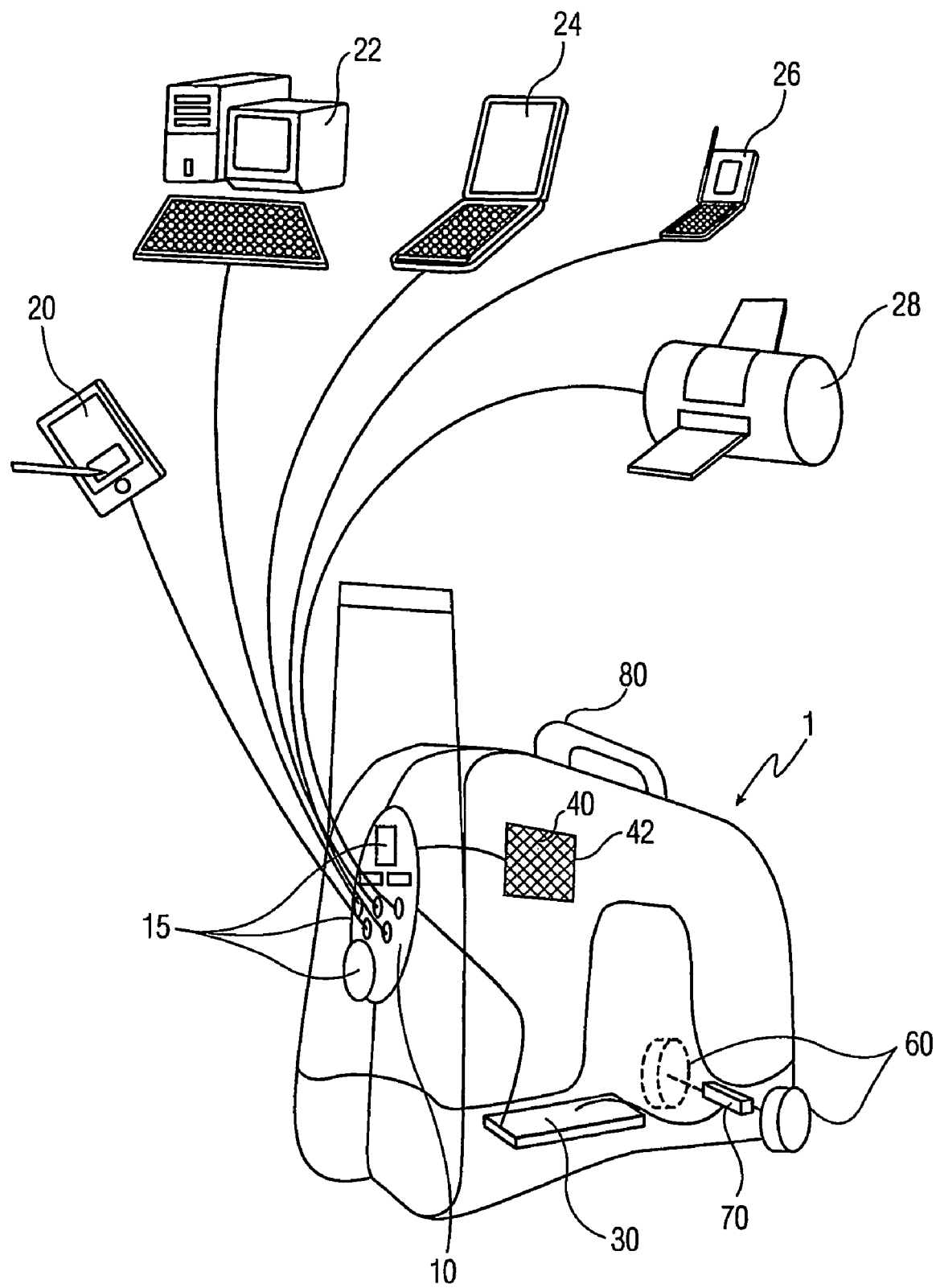
FIG. 1 is a perspective view of a piece of luggage, in accordance with an illustrative embodiment of the present invention.

Referring to the drawings and, in particular, FIG. 1, a piece of luggage in accordance with an illustrative embodiment of the present invention is shown and generally represented by reference numeral 1. As shown, luggage 1 essentially has an interface 10 for cooperating with one or more electronic and/or wireless devices 20, 22, 24, 26, 28, a power source 30, an antenna 40, and a wireless communication system 50, or any combination of the same.

The luggage 1 can also preferably have rolling capabilities with one or more wheels 60 rotatably connected thereto to facilitate or ease transporting the luggage 1. Preferably, one or more wheels 60 cooperate with an electric hub motor 70 or similar device for generating electric power via the rotating action of the one or more wheels 60. In addition, the luggage 1 can have one or more handles 80 including for example, a telescopic or extensible handle and/or a more conventional carrying handle. The luggage 1 may further have any of a variety of compartments, accessory attachments, and/or other features suitable for improving the effective use thereof.

The interface 10 preferably has one or more connectors 15. Preferably, the one or more connectors 15 are suitable for accommodating a variety connection types including, for example, cable connections, docking connections, radio connections, infrared connections, and/or wireless connections. In addition, the interface 10 can have adaptor capabilities and/or a power outlet/socket suitable for providing electric power to various different electronic devices. Preferably, the interface 10, under normal circumstances, can cooperate with any wireless enabled device. Examples of such devices include not only PCs, PDAs, and laptops but any of the following that have wireless capabilities; a vehicle, an appliance, a keyboard, and the like.

The one or more electronic and/or wireless devices 20, 22, 24, 26, 28 are preferably portable, such as for example, laptop computers, PDAs, cell phones, digital cameras, portable printers, and the like. Other devices also falling within the scope of the invention include, for example, clothes irons, hair clippers/shavers, hair irons, hair dryers, and any other portable personal care device. It is noted that any of a variety of other electronic devices may likewise be suitable for cooperating with the present invention.

The power source 30 is preferably a rechargeable battery that can be recharged via a power generation assembly 70 incorporated into the luggage 1 and/or by an external power supply. The power generation assembly 70 preferably cooperates with one or more wheels 60 of the luggage 1 such that the rechargeable battery 30 can be recharged via the rotating action of one or more wheels 60 of the luggage 1. The rechargeable battery 30 preferably has a low profile being relative flat so as to not take up a significant amount of space. The rechargeable battery 30 can be either selectively connected or integrally connected with a surface 42 of the luggage 1. The power source 30 preferably, in addition to providing temporary power to the one or more electronic and/or wireless devices 20, 22, 24, 26, 28, can provide power to the interface 10, the antenna 40, and/or the wireless communication system 50 as necessary for each feature to operate in accordance with the present invention.

Figure 4:
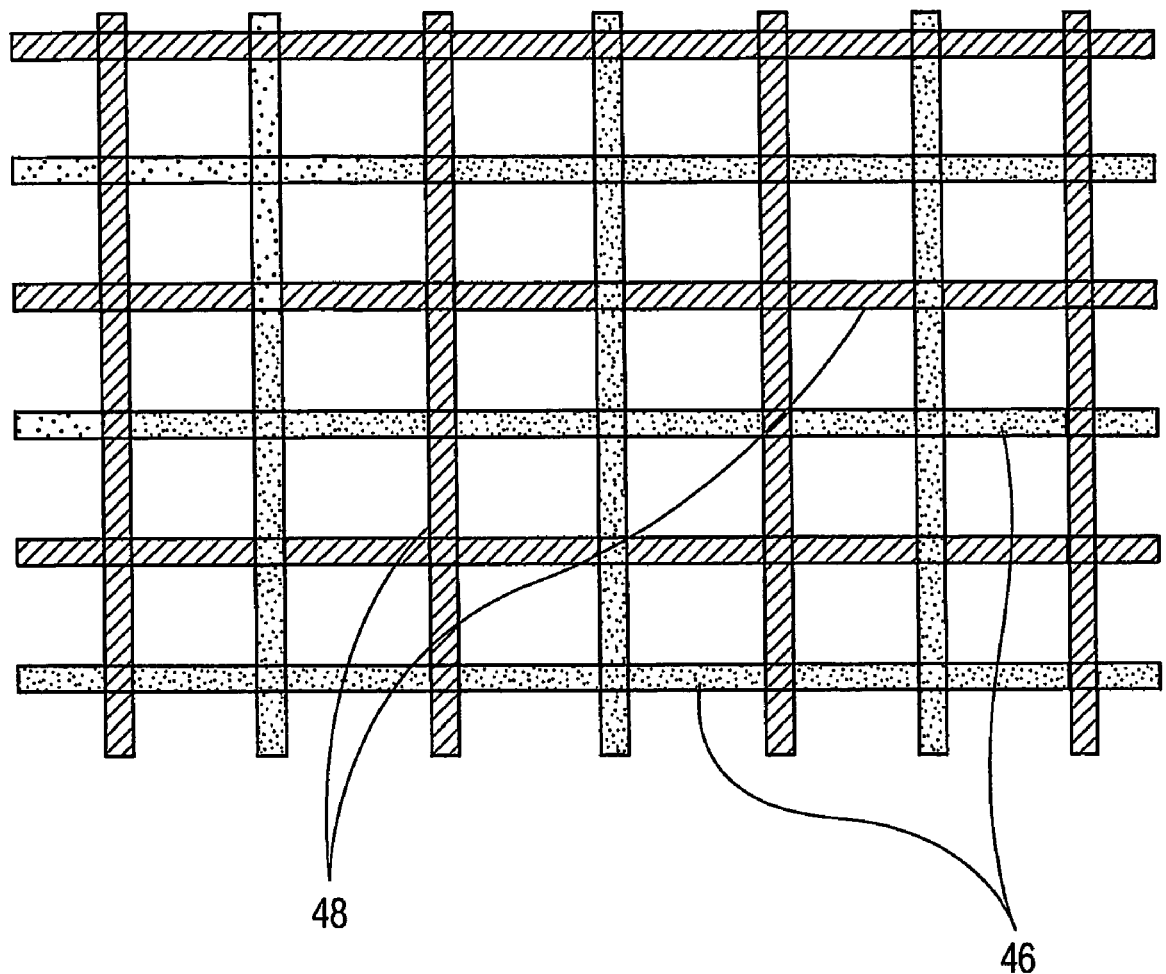
FIG. 4 is a plan view of a fiber construction, in accordance with an illustrative embodiment of the present invention.

The antenna 40 preferably cooperates with the one or more electronic and/or wireless devices 20, 22, 24, 26, 28 either through the interface 10 or directly to enhance the capabilities of such devices. The antenna 40 can preferably be a printed conductive ink 40 and can preferably be integral with a surface 42 of the luggage 1. The antenna 40 may also have any other form suitable for facilitating the intended purposes of the one or more electronic and/or wireless devices 20, 22, 24, 26, 28. For example, the antenna 40 may have a fiber construction 44 as shown in FIG. 4 with one or more conductive fibers 46 being intertwined with one or more non-conductive fibers 48 in accordance with any known conventional method for weaving, sewing or knitting to form a flexible, resilient and discrete antenna that is integral with the material used to form the luggage 1. Also, the antenna 40 may be separable, adjustable, extensible, and/or replaceable as necessary for accommodating different functional needs.

Figure 2:
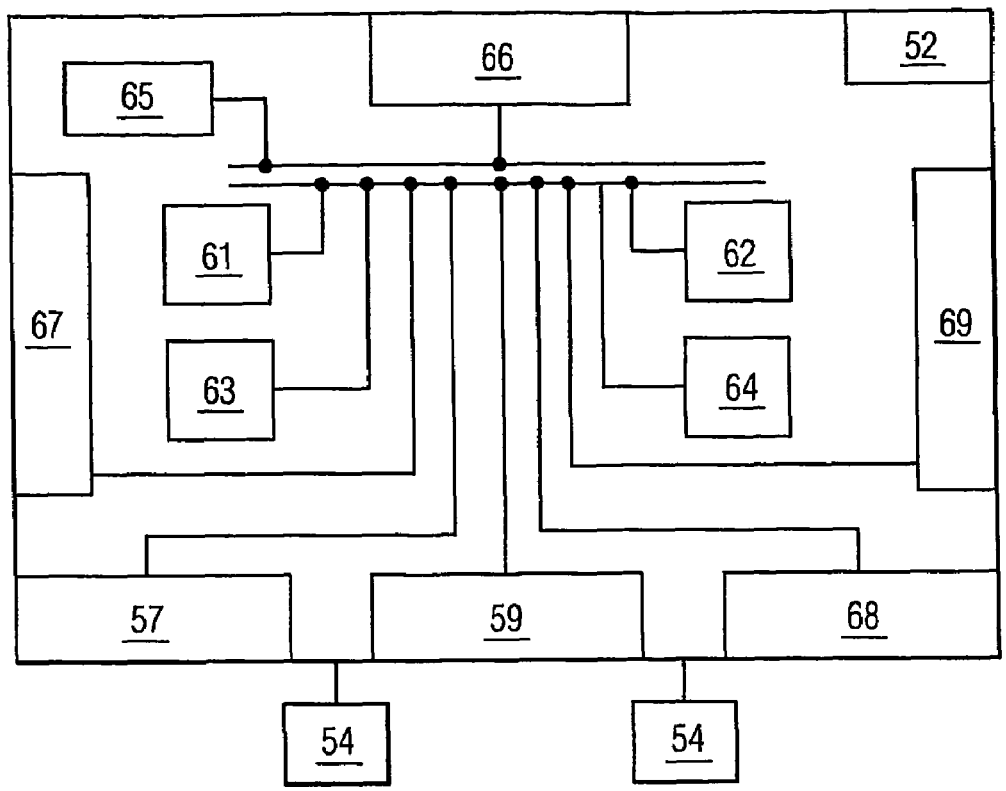
FIG. 2 is a schematic diagram of a wireless communication system, in accordance with an illustrative embodiment of the present invention.
Figure 3:
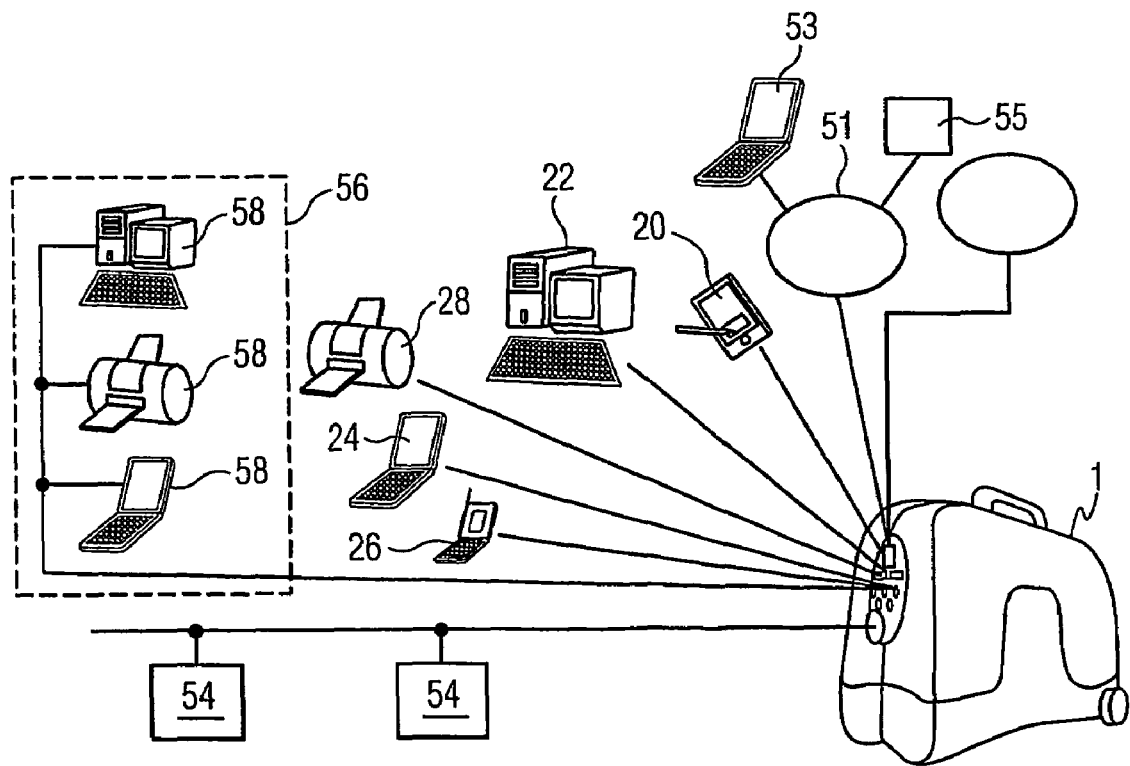
FIG. 3 is a schematic diagram of alternative arrangements, in accordance with an illustrative embodiment of the present invention.

Referring to FIGS. 2 and 3, the wireless communication system 50 preferably has an access server 52 connectable with one or more local network access points 54 capable of cooperating with the one or more electronic and/or wireless devices 20, 22, 24, 26, 28. The wireless communication system 50 may also preferably be selectively connectable with an area network 56 (e.g., LAN, PAN, WAN, etc.) having one or more end stations 58 for allowing the wireless communication system 50 to cooperate with currently existing area networks within a vicinity. Preferably, the wireless communication system 50 can also be connected to a remote communications network 51, such as for example, the Internet for allowing the one or more electronic and/or wireless devices 20, 22, 24, 26, 28 connected to the wireless communication system 50 to communicate with remote users 53 and/or wireless communication systems of other remote sites 55. The wireless communication system 50 can have an internet interface 57, an area network interface 59, a microprocessor 61, a memory 63, an input/output device 65, an infrared interface 67, a radio interface 69, and/or any other suitable for the systems intended purpose such as a GPS interface 62, a GPRS interface 64, a PBX interface 66, and a POTS or PSTN interface 68. In addition to the foregoing, the wireless communication system 50 may be able to facilitate, automatically or selectively, multiple and varied connections simultaneously or discretely. Further, the wireless communication system 50 may also have security features such as authorization and/or authentication protocols.

The present invention having been thus described with particular reference to the preferred forms thereof, it will be obvious that various changes and modifications may be made therein without departing from the spirit of the present invention as defined herein.

What is claimed is:

1. Luggage comprising: an interface for cooperating with one or more electronic and/or wireless devices; and a power source, wherein said interface facilitates the cooperation between said one or more electronic and/or wireless devices and said power source and wherein a power generation assembly cooperates with one or more wheels of the luggage such that said power source is powered by rotatably actuating said one or more wheels.

2. The luggage of claim 1, wherein said interface has one or more connectors.

3. The luggage of claim 2, wherein said one or more connectors accommodate different types of connections including cable type connections, docking type connections, radio type connections, infrared type connections, or wireless type connections, or any combination of the same.

4. The luggage of claim 1, wherein said power source is a rechargeable battery.

5. The luggage of claim 4, wherein said rechargeable battery is recharged via said power generation assembly.

6. The luggage of claim 4, wherein said rechargeable battery is rechargeable via an external power source.

7. The luggage of claim 4, wherein said rechargeable battery is integral with a surface of the luggage.

8. The luggage of claim 1, further comprising an antenna integral with an outside surface of the luggage.

9. The luggage of claim 8, wherein said antenna enhances the capacity of said one or more electronic and/or wireless devices.

10. The luggage of claim 8, wherein said antenna is formed from a printed conductive ink printed on said outside surface of the luggage.

11. The luggage of claim 8, wherein said antenna cooperates with said one or more electronic and/or wireless devices via said interface.

12. The luggage of claim 8, wherein said antenna has a fiber construction.

13. The luggage of claim 12, wherein said fiber construction forms a portion of an outside surface of the luggage.

14. Luggage comprising: an interface for cooperating with on one or more electronic and/or wireless devices; an antenna integral with an outside surface of the luggage, one or more electronic and/or wireless devices; and an integral power source that cooperates with one or more wheels of the luggage such that said integral power source is powered by rotatably actuating said one or more wheels, wherein said interface facilitates the cooperation between said one or more electronic and/or wireless devices and said antenna.

15. The luggage of claim 14, wherein said antenna has a fiber construction.

16. The luggage of claim 15, wherein said fiber construction forms a portion of said outside surface of the luggage.

17. The luggage of claim 14, wherein said antenna is formed from a printed conductive ink printed on said outside surface of the luggage.

18. The luggage of claim 14, wherein said antenna cooperates with said one or more electronic and/or wireless devices via said interface.

19. Luggage comprising: an interface for cooperating with one or more electronic and/or wireless devices; a wireless communication system integrally formed with an outside surface of the luggage; and an integral power source that cooperates with one or more wheels of the luggage such that said integral power source is powered by rotatably actuating said one or more wheels, wherein said interface facilitates the cooperation between said one or more electronic and/or wireless devices and said wireless communication system.

20. The luggage of claim 19, wherein said antenna has a fiber construction.

21. The luggage of claim 20, wherein said fiber construction forms a portion of said outside surface of the luggage.

22. The luggage of claim 19, wherein said interface has one or more connectors.

23. The luggage of claim 22, wherein said one or more connectors accommodate different types of connections including a cable type connection, a docking type connection, a radio type connection, an infrared type connection, or a wireless type connection, or any combination of the same.

* * * * *